United States Patent [19]
Rao et al.

[11] Patent Number: 5,569,552
[45] Date of Patent: *Oct. 29, 1996

[54] LEAD-ACID BATTERY HAVING A FLUID COMPARTMENT FOR REDUCING CONVECTION-INDUCED HEAT TRANSFER

[75] Inventors: Purushothama Rao, Eagan; Thomas F. Uhlemann, Edina; William H. Kump, West St. Paul, all of Minn.

[73] Assignee: GNB Technologies, Inc., Mendota Heights, Minn.

[*] Notice: The term of this patent shall not extend beyond the expiration date of Pat. No. 5,460,900.

[21] Appl. No.: 501,397

[22] Filed: Jul. 12, 1995

Related U.S. Application Data

[63] Continuation-in-part of Ser. No. 287,191, Aug. 8, 1994, Pat. No. 5,460,900.
[51] Int. Cl.⁶ .................................................. H01M 10/50
[52] U.S. Cl. .......................... 429/72; 429/120; 429/148; 429/176
[58] Field of Search .................................. 429/120, 148, 429/176, 71, 72, 163

[56] References Cited

U.S. PATENT DOCUMENTS

| | | | |
|---|---|---|---|
| 4,107,402 | 8/1978 | Dougherty et al. | 429/120 |
| 5,212,025 | 5/1993 | Shibata et al. | 429/120 |

FOREIGN PATENT DOCUMENTS

| | | | |
|---|---|---|---|
| 481891 | 3/1938 | United Kingdom | 429/120 |

*Primary Examiner*—John S. Maples
*Attorney, Agent, or Firm*—Leydig, Voit & Mayer, Ltd.

[57] ABSTRACT

A lead-acid storage battery for starting, lighting and ignition applications is disclosed which minimizes convection-induced, heat transfer from the vehicle underhood environment surrounding the battery to the battery itself and comprises an injection-molded, integral plastic container, or a two-piece container, having a multi-wall configuration in which an inner container includes the cell elements of the battery and at least one outer container spaced from the inner container provides at least one fluid compartment for allowing fluid flow through the fluid compartment to achieve the desired thermal regulation, the fluid flow path being created by a series of spaced fluid baffles.

14 Claims, 15 Drawing Sheets

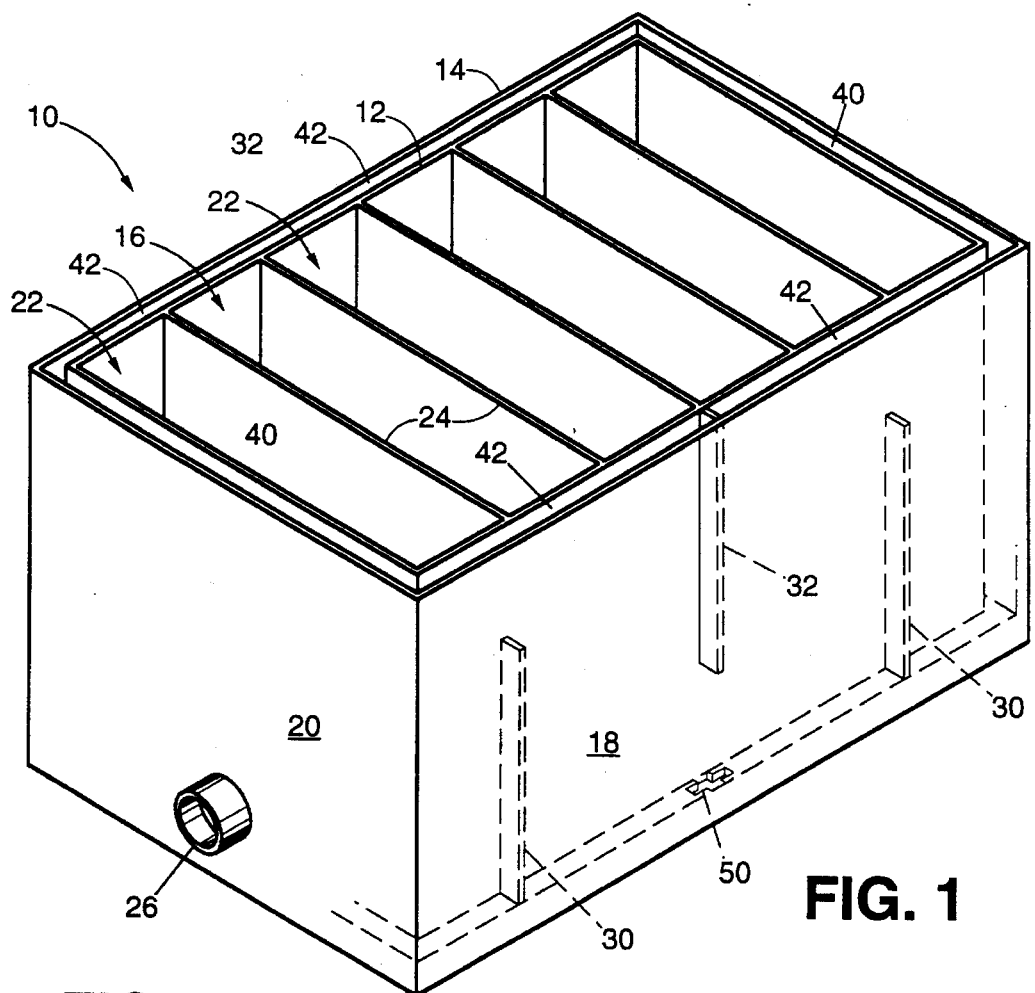
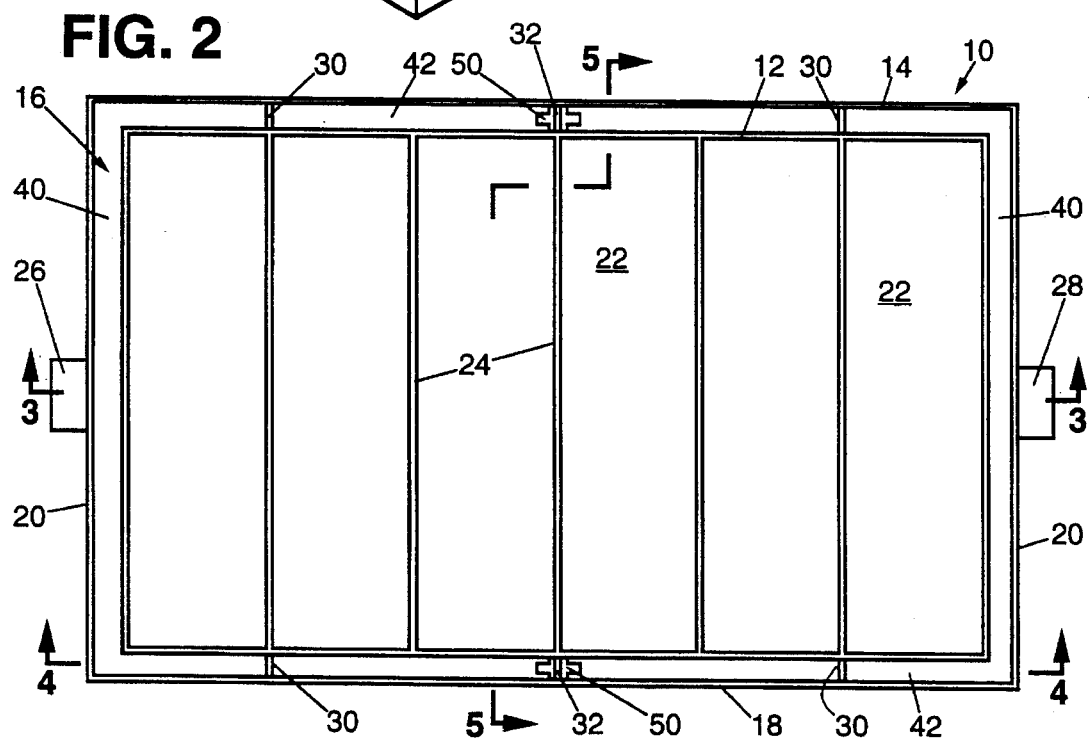

LEAD-ACID BATTERY HAVING A FLUID COMPARTMENT FOR REDUCING CONVECTION-INDUCED HEAT TRANSFER

RELATED APPLICATIONS

This is a continuation-in-part application of co-pending Ser. No. 08/287,191, filed Aug. 8, 1994, now U.S. Pat. No. 5,460,900.

FIELD OF THE INVENTION

This invention relates to lead-acid batteries and, more particularly, to lead-acid batteries allowing the use of external passive or active thermal heating or cooling by using a liquid, gas or vacuum means to maintain and operate the batteries at a designated temperature range regardless of the exposed ambient conditions.

DESCRIPTION OF THE PRIOR ART

Current vehicles, particularly automobiles, emphasize aerodynamic styling and are equipped with a variety of driver comfort features and safety devices. These features have resulted in such vehicles operating in many situations with very high underhood engine temperatures. During stop-and-go driving, or while the engine of the vehicle is idling, there is typically very little air or wind movement, causing the underhood air temperatures to often exceed 200° F. in some parts of the United States.

Extended exposure of the lead-acid battery used for the starting, lighting and ignition in such vehicles (often termed "SLI" batteries) leads to the loss of water from the electrolyte due to excessive gassing and attendant water loss in vehicle charging and evaporation as well as to rather rapid degradation of the battery components. In particular, the positive grids used in such SLI batteries tend to exhibit substantially accelerated corrosion at such high temperatures. Ultimately, the acceleration of positive grid and strap corrosion and other material degradation results in premature battery failure and a no-start condition for the vehicle.

Even further, since the SLI batteries are usually located in the front of the underhood compartment where there is little air movement around, the problem is exacerbated by the engine fan blowing hot air onto the battery in certain vehicles. The battery operating temperature thus increases primarily due to the convective heat surrounding such batteries and is usually not a result of any heat effects arising from the charge and discharge processes of the battery itself.

Substantial material innovations have been made which have significantly improved the situation. However, there is a desire to even further overcome the detrimental effects of higher underhood temperature and to deal with the conditions that cause premature battery failure.

Thus, considerable effort has been expended in an attempt to deal with these high underhood temperatures and conditions. Some vehicles are indeed even equipped with heat shields for the batteries by the vehicle manufacturer. Further, various types of heat shields have been devised for the SLI lead-acid batteries themselves. One type of heat shield uses insulating materials, such as fiberglass and polystyrene and polyurethane foams, which are wrapped, or otherwise disposed, around the periphery of the battery container. For example, U.S. Pat. No. 2,707,721 to Anderson et al. discloses a jacket fabricated from a composite material incorporating fiberglass. Another approach effectively creates a double-walled battery container having a sealed insulating air space between the walls, such as is disclosed in U.S. Pat. No. 5,212,025 to Shibata et al. Shibata et al. thus show a heat-shielding case which has projections provided on the lower inner sides. When the battery container is placed into the heat-shielding case, projections engage with corresponding recesses provided on the sidewalls of the battery container to detachably secure the battery container in position.

Further, U.S. Pat. No. 4,107,402 to Dougherty et al. discloses a battery and battery container having air-flow passages therethrough. The container includes partitions separating the cells of the battery, and each partition comprises a pair of spaced-apart, parallel partition walls which define narrow, generally planar, air-flow passages between the cells of the battery. These spaced-apart partition walls are integrally joined together at a location adjacent a central portion which includes an aperture to permit the intercell welding of the adjacent cells. It is further contemplated that the sidewalls of a battery can include vertically extending elongated slots which communicate with the air-flow passages. Similarly, the cover of the battery is further provided with a plurality of parallel spaced apart slots which communicate with the air-flow passages. As is discussed therein, the Dougherty et al. '402 patent concerns facilitating heat transfer from the battery itself.

The foregoing are only illustrative of the considerable prior effort that has been made in attempting to solve various thermal problems. Yet, despite all of this considerable prior effort, there still exists the need to provide a satisfactory solution to the underhood environment in which SLI lead-acid batteries operate in current automobiles. Even further, any proposed approach to solving the problem should allow manufacture and assembly by existing automotive battery manufacturing processes with minimum complications. Stated differently, the commercial efficacy of a proposed solution depends not only upon the effectiveness in solving the in-service problem, but must also take into account the costs attendant with the proposed solution. Any solution that requires significant modifications in the SLI battery manufacturing and assembly process can cause problems that can only be overcome, if at all, at substantial expense and with considerable difficulty.

Accordingly, a primary object of the present invention is to provide a lead-acid battery capable of reducing, or otherwise altering, the thermal effects of the high vehicle underhood ambient temperatures on the battery. A more specific object provides a battery capable of reducing convection-induced, heat transfer from the vehicle engine environment surrounding the battery to the battery itself.

Another object of this invention is to provide such a lead-acid battery that is amenable to commercial production on a high volume, mass production basis, as is required for automotive SLI lead-acid batteries and the like. A related and more specific object provides such a battery that can be manufactured using existing technology for making lead-acid batteries with only relatively minor modifications in existing processes being required.

These and other objects and advantages of the invention will be apparent to those skilled in the art upon reading the following description and upon reference to the drawings.

SUMMARY OF THE INVENTION

The subject invention provides a lead-acid battery capable of reducing the thermal effects of the high underhood ambient temperatures on such a battery by preventing, or at least significantly reducing, convection-induced, heat transfer from the higher vehicle engine ambient temperature environment to the battery itself. A principal aspect of the present invention utilizes a battery container designed to allow manufacturing by any desired fabricating technique, principally by injection molding, essentially the same as utilized in the manufacture of currently used containers for lead-acid batteries, particularly SLI batteries. The battery container employed in the present invention comprises a multi-wall container having at least one fluid compartment with an annular space defined by the space between an inner and outercontainer, integrally formed in certain embodiments, which can serve to hold a liquid, gas or vacuum for the purpose of maintaining a specific desired battery temperature. A series of fluid baffles provide a path for a fluid to be circulated around the end and side walls of the battery while also aiding in maintaining the requisite strength characteristics of the battery. According to other embodiments, a fluid flow path can be created under the bottom wall of the battery. The lead-acid battery of the present invention can be manufactured and assembled using the processes and equipment typically employed in assembling conventional SLI lead-acid batteries.

DESCRIPTION OF THE DRAWINGS

FIG. 1 is a perspective view of one embodiment of a container used in the battery of the present invention;

FIG. 2 is a top elevation view of the container shown in FIG. 1 and showing the positioning of the fluid ingress to, and egress from, the fluid compartment;

DETAILED DESCRIPTION OF THE INVENTION

Figure 3:
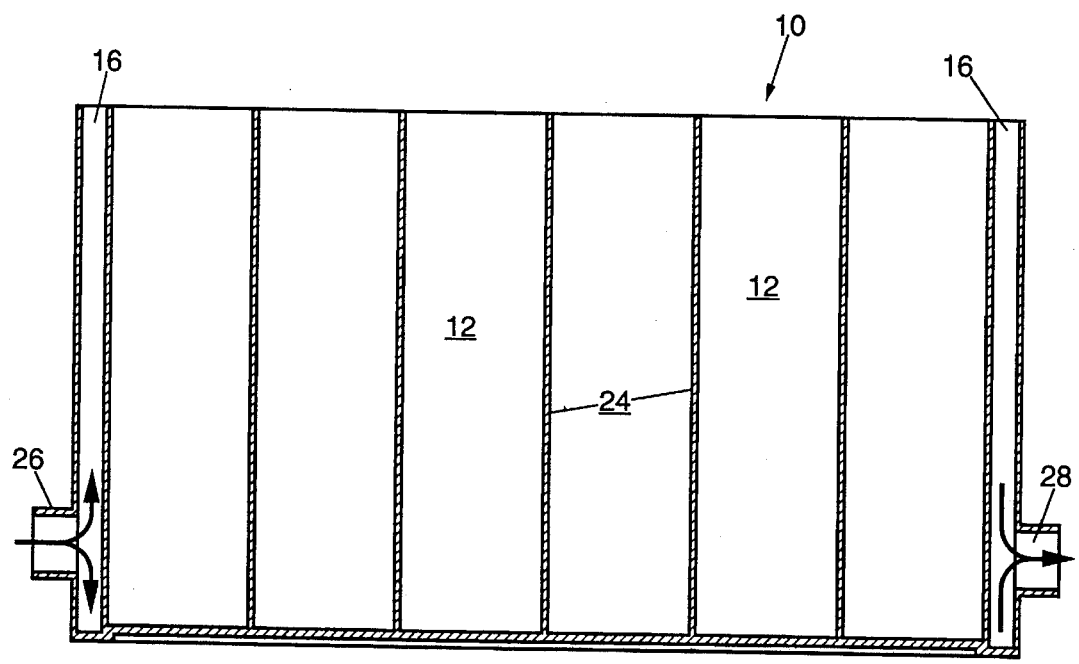
FIG. 3 is a cross-sectional view taken generally along line 3—3 of the container as shown in FIG. 2 and further showing the fluid compartment.

As illustrated in the embodiment shown in FIGS. 1–5, the battery container shown comprises an integrally molded, multi-walled container 10 having an inner container 12 and with intermediate walls and an outer container 14 and the multi-walls forming an annular space. As can best be seen in FIGS. 1–3, a fluid compartment, typically for maintaining battery temperature, shown generally at 16, surrounds the periphery of the inner container 12. Side walls 18 of the outer battery container 14 form the side walls of the battery while end walls 20 of outer container 14 comprise the end walls of the battery as manufactured.

The inner container 12 is divided into a series of cells shown generally at 22 by cell partitions 24. As illustrated, six cells are provided for a twelve volt battery, as is of course customary for automotive SLI batteries, for a six volt battery only three cells will be used and the like. The present invention is, of course, applicable to containers having one or more cells. The number of cells will be determined by the requirements of the particular end use application.

Figure 4:
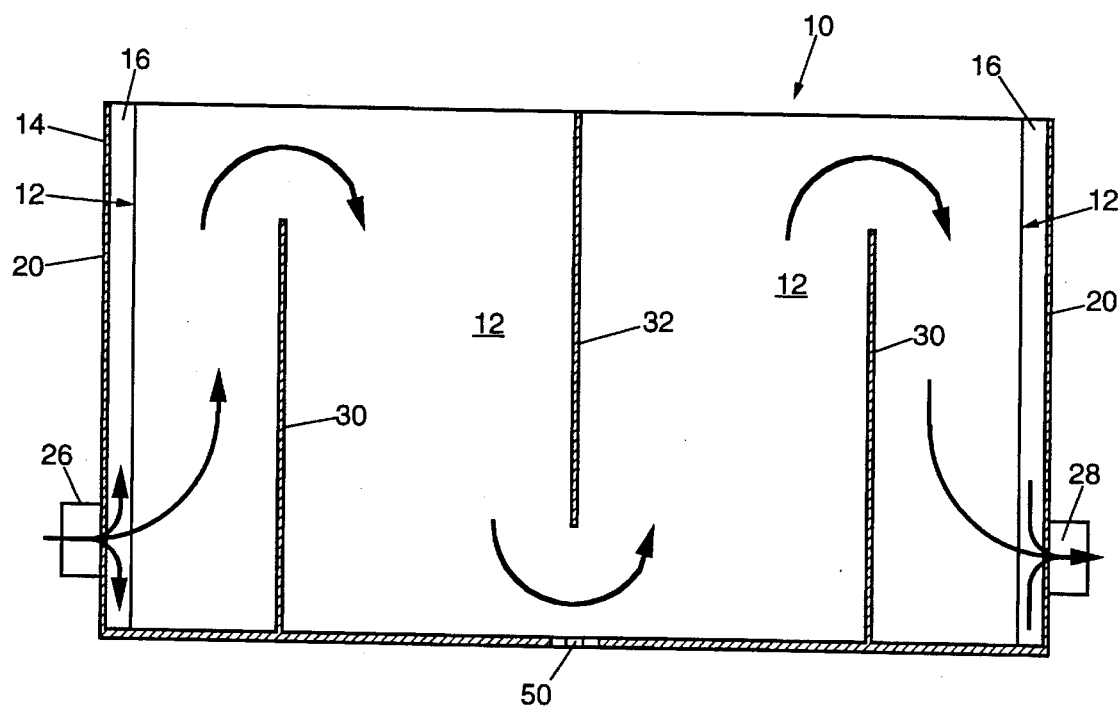
FIG. 4 is a cross-sectional view taken generally along line 4—4 of the container as shown in FIG. 2 and illustrating the relative positioning of the fluid baffles positioned in the fluid compartment.

Fluid ingress into fluid compartment 16 is provided through fluid inlet 26. Where fluid egress is desired, this can be achieved through fluid outlet 28, as shown in FIGS. 2–4.

Fluid inlet 26 and optional fluid outlet 28 may be positioned as desired consistent with the objective of achieving the desired fluid flow when continuous fluid flow is employed. Principally, the size of fluid inlet 26 will be determined by the requirements for the desired fluid flow, including the size of the fluid compartment 16. Further, the particular location of fluid inlet 26 and optional fluid outlet 28 will depend upon the types of holddowns required to maintain the battery in the vehicle. Positioning the fluid inlet 26 and optional fluid outlet 28 as shown in FIGS. 1–3 provides a configuration that not only can be readily molded by conventional injection molding techniques, but also should not interfere with conventional battery holddowns currently being employed.

As an example of an embodiment that should be satisfactory, the fluid inlet 26 and optional fluid outlet 28 are circular in shape with an inside diameter of about 0.75 inch. These inlets are positioned such that their centerline is about 0.225 inch from the bottom of the container 10. A fluid compartment 16 with about 0.325 inch width should also be satisfactory.

Pursuant to one aspect of the present invention, a series of fluid baffles are utilized to provide a desirable path for fluid flow around the periphery of the inner container 12 and through the fluid compartment 16. In addition to being positioned to achieve the desired fluid flow path, the fluid baffles employed should be configured and located so as to provide the container 10 with adequate strength characteristics to endure the conditions in transport and service. More particularly, the strength imparted should be adequate to insure that fluid compartment 16 and the desired fluid flow path are not unduly adversely affected. To this end, and as best seen in FIG. 4, two upstanding fluid baffles 30 are provided with a downwardly depending fluid baffle 32 being positioned therebetween.

Figure 5:
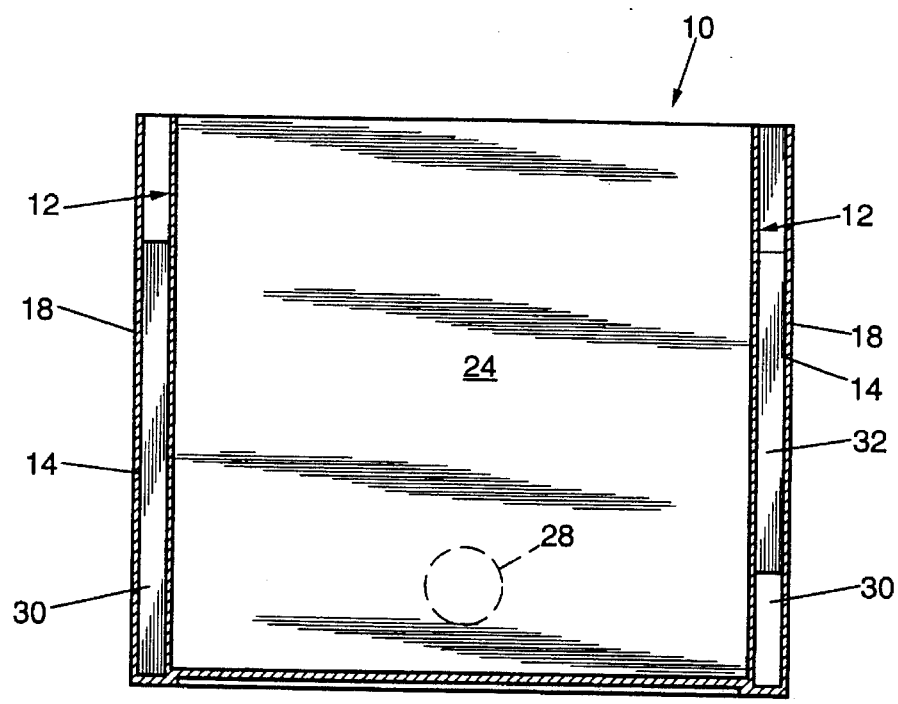
FIG. 5 is a cross-sectional view taken generally along line 5—5 of the container as shown in FIG. 2 and further illustrating the positioning of certain of the fluid baffles in the fluid compartment.

The size, location and number of the fluid baffles 30 and 32 can be varied as desired, consistent with achieving the fluid flow path and strength characteristics considered appropriate for the particular application. It should be satisfactory for most applications to use three fluid baffles positioned and configured as shown in FIG. 5. While not essential, enhanced strength characteristics should be achieved by aligning fluid baffles 30 and 32 with cell partitions 24. It will also be preferable to locate fluid inlet 26 such that incoming fluid into fluid compartment 16 will contact a fluid baffle to initiate a moving fluid flow path that will traverse the side walls 18 of container 10. As one illustrative example of dimensions considered suitable for an SLI lead-acid battery, the thickness of fluid baffles 30 and 32 can be about 0.70 inch (similar to the thickness of cell partitions 24) and can terminate about 1.5 inch from, respectively, the top and bottom of battery container 10. If desired, as may be appreciated, fluid baffles can be provided in end part 40 as well.

Any thermoplastic material may be utilized which possesses the desired characteristics for molding battery containers pursuant to this invention. As is well known, the currently used materials for SLI lead-acid batteries comprise an ethylene-propylene impact-modified copolymer in which polypropylene is a major constituent.

It should be appreciated that the material used for the container may, in whole or in part, be dictated by the particular mode of thermal regulation employed. The choice of the thermoplastic material utilized for molding containers will be based on the inherent gas and water vapor transport properties through the container walls. It will be necessary to use thermoplastic materials having the lowest gas vapor and water permeability or transmission rates through the thickness. Similarly, the type, number and configuration of fluid baffles employed may likewise be influenced by the specific thermal regulation mode utilized. Both of these aspects will be discussed hereinafter in conjunction with the discussion of the various thermal regulation modes themselves.

In accordance with another aspect of the present invention, a molding sequence and mold components are utilized which allow the battery container 10 to be made by injection molding techniques that are compatible with molds and techniques currently being utilized for the mass production of SLI lead-acid battery containers and covers. Thus, the present invention includes a molding sequence that achieves the reliable production of a container with the desired configuration for the fluid compartments employed that are stably dimensioned.

As is conventionally carried out, cells 22 and cell partitions 24 are made using mold core components sized to form the cells 22 that are spaced apart to define the desired thickness of the cell partitions 24. Typically, the mold core components can be free-standing because the metal mass of such components is more than adequate to avoid deflection of these components due to the plastic injection during molding.

Figure 6:
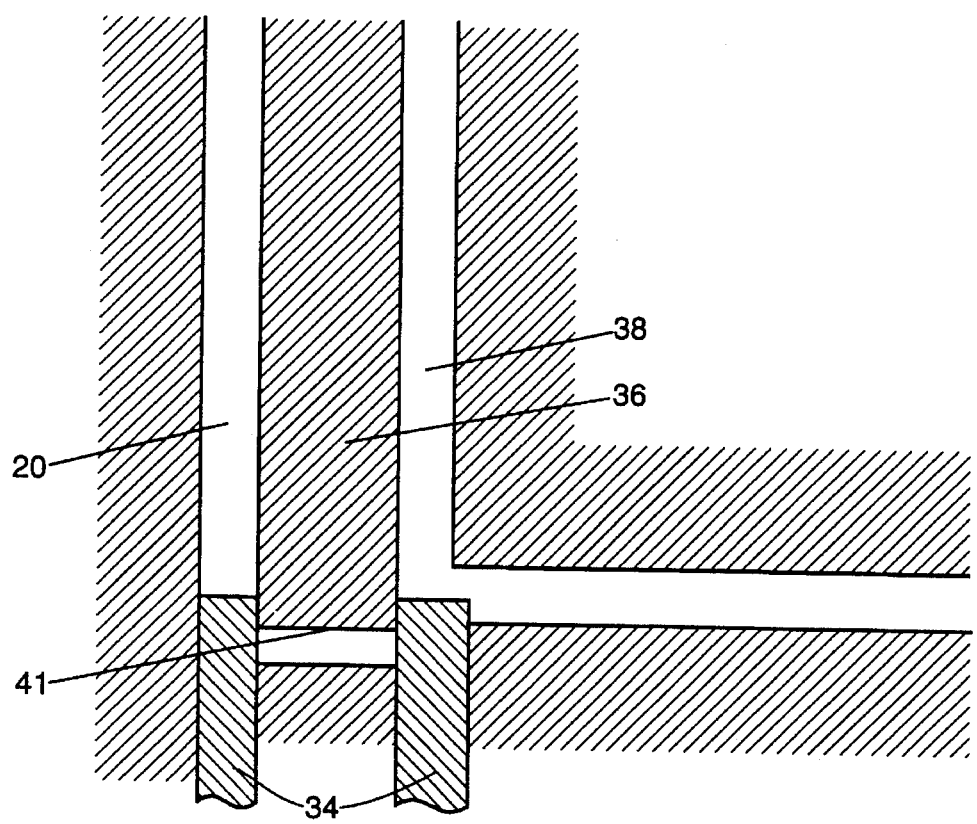
FIGS. 6 and 7 are partial schematic views, respectively showing core locks in a first position for holding the mold core pieces in place during molding of the container (FIG. 6) and the core locks withdrawn to a second position so as to allow completion of the molding of the container (FIG. 7)
Figure 7:
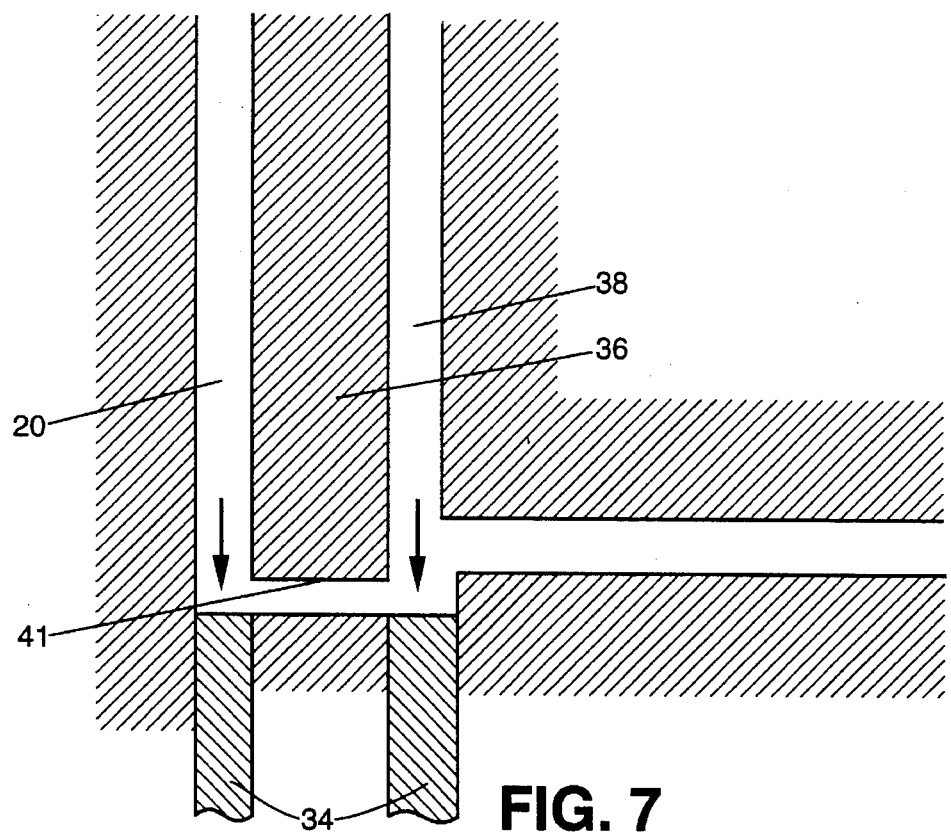

However, the fluid compartment 16 will generally be of a size where deflection of the core component will likely occur, should free-standing core components be used. Accordingly, and as is illustrated in FIGS. 6 and 7, core locks are utilized to minimize, if not essentially eliminate, deflection of the mold core components that define fluid compartment 16. In this fashion, production of a container having a stably dimensioned fluid flow compartment 16 can be achieved. Thus, by eliminating deflection of the core components which define the shape of the fluid compartment, the dimensions of the resulting, injection-molded plastic fluid compartment will be those dictated by the shape and configuration of the core components used. Deflection that could undesirably affect the functioning of the desired thermal regulation is avoided. To this end, and as is shown in FIG. 6, core locks 34 are in position to maintain a fluid compartment mold core 36 in the desired position between what will become end wall 20 of battery container 10 and end wall 38 of inner container 12. The core locks 34 thus retain the bottom edge 41 of core 36 in position during the injection of plastic into the mold to form end walls 20 and 38 and the adjacent part of fluid compartment 16.

Completion of the bottom of the battery container 10 is then achieved by withdrawing core locks 34 as seen in FIG. 7. As is thus shown, core locks 34 are retracted so that the bottom areas, not filled with plastic when the core locks 34 were in place, now can be filled with plastic.

If desired, the core locks 34 can be essentially continuous for the width of the battery. However, it should likewise be suitable to utilize a series of separate core locks that hold the core 36 along its bottom edge at spaced, suitably located positions to prevent undue deflection during molding.

While illustrated for forming the end parts 40 of fluid compartment 16, it should be appreciated that this same technique should desirably be employed for forming the side portions 42 as well (FIGS. 1 and 2). The same considerations apply.

In addition, it is necessary to suitably configure the mold to make provision for any downwardly extending fluid baffles 32, as are utilized in the embodiment of FIGS. 1–5. In the illustrative embodiment shown in FIGS. 8 and 9, side wall mold cores 44 and 46 are keyed to accept core insert 48. In this fashion, the plastic being injected fills only the desired part of the height of the gap between these cores 44 and 46, thereby defining the length of the fluid baffles 32.

Figure 8:
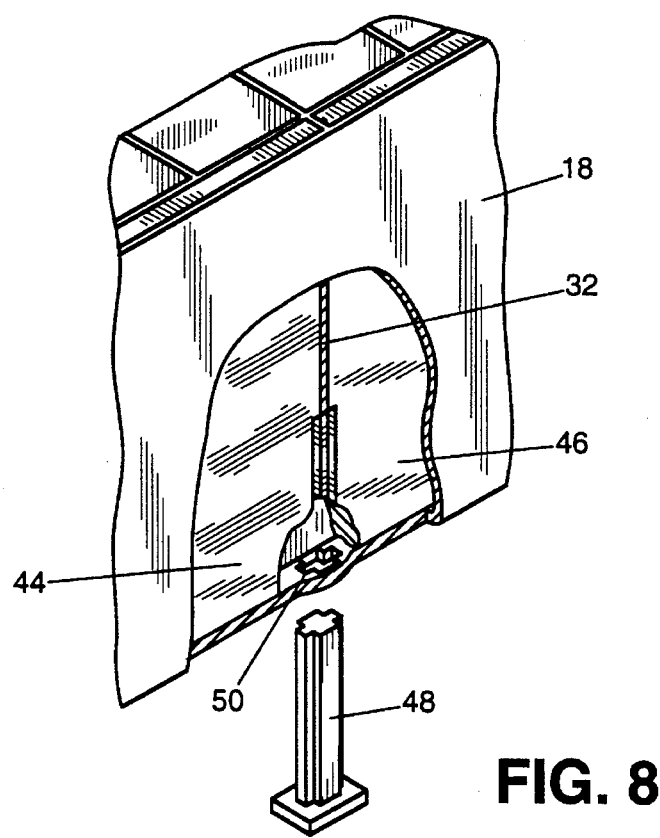
FIGS. 8 and 9 are partial fragmentary perspective views partially cut away to show the keyed core insert employed to form a downwardly extending fluid baffle exploded off (FIG. 8) and then in position (FIG. 9) as would occur in molding.
Figure 9:
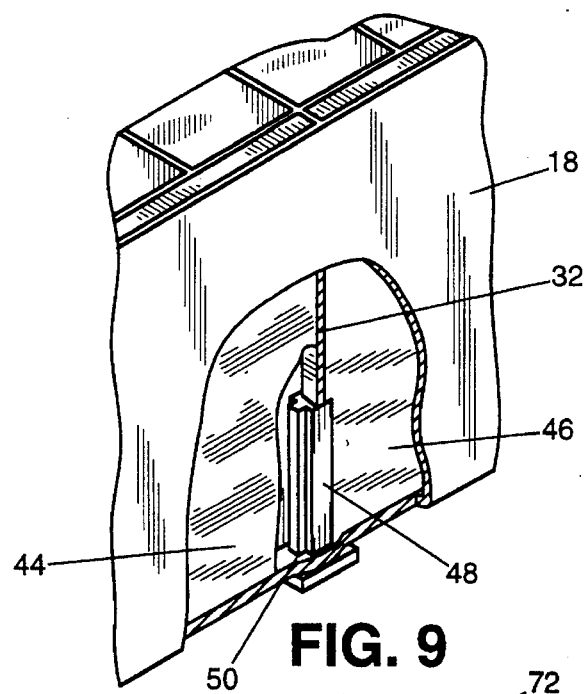

As may be appreciated, and as best seen in FIGS. 8 and 9, the bottom of the battery container 10 formed as shown will have apertures 50 resulting from use of core insert 48 and its withdrawal after completion of the molding operation. If desired, the battery may rest in service on a rubber or other mat to restrict fluid flow from fluid compartment 16 out through apertures 50. Alternatively, if considered desirable, plastic inserts may, of course, be configured and sealed in place in apertures 50 to provide a fluid-tight fluid compartment.

As has thus been seen, the modifications discussed herein may be incorporated into injection molding sequences commonly used in molding conventional containers for SLI lead-acid batteries. The present invention is thus readily amenable to mass production in a reliable fashion.

Thermal regulation of the battery in the automobile or other vehicle may be achieved by any desired means to provide the level of thermal regulation or modulation considered appropriate. In general, optimum temperatures for performance and service life will be achieved by maintaining the battery temperature within the range of 65° to 90° F. in the vehicle. As one example, such thermal regulation can be achieved by filling the fluid cooling compartment with stagnant air or a gas. The use of low thermal conductivity gasses such as argon, carbon dioxide and nitrogen are illustrative examples. Indeed, if suitable for the requirements of the particular application, it might be satisfactory to use a liquid fluid to fill the fluid compartment.

For some applications, it might be desirable to provide a continuous air flow through the annular fluid compartment or compartments used. This could be achieved by connecting the cooling and/or heating air of the automobile or other vehicle into the fluid inlet and/or fluid outlet in a designated annular space so that air at an appropriate temperature circulates through the fluid compartment to maintain the batteries at the desired temperature range of 65° to 90° F. in the vehicle. Similarly, gasses such as the low thermal conductivity gasses previously discussed could likewise be circulated through the fluid compartment.

Still further, the thermal regulation mode could employ a specific liquid fluid stream which would be circulated through the annular space to control the battery temperature. This could be achieved by using any desired cooling liquid. Many useful cooling liquids are known. Indeed, as is known, cooling liquids could be used that are converted into a gaseous form in the temperature range desired for operation of the battery. Particularly useful are specific lower thermal conductivity gaseous/liquid mediums such as, for example, halogenated hydrocarbons, particularly chlorofluoro hydrocarbons, and other organic liquids that remain liquid at temperatures less than 90° F. or so and become gaseous above this temperature.

Other thermal regulation modes would involve maintaining a vacuum in the fluid compartment annular space after assembly and formation of the battery. The vacuum level desired could be pulled using any known technique desired. For this mode, the fluid compartment in the container used, preferably, should be adequately configured to hold the desired vacuum. This will necessitate adequately sealing off apertures 50 as has been discussed herein.

As previously alluded to, the type of thermal regulation mode used may well affect, or dictate, the type and configuration of fluid baffles employed. Thus, where vacuum or a stagnant fluid is used, the principal function of the fluid baffles becomes maintaining the desired integrity of the fluid compartment. In such instances, the path of the fluid flow through the fluid compartment no longer is an issue. Accordingly, in such instances, there is no need to utilize downwardly extending fluid baffles and all upwardly extending baffles may be used, thereby simplifying somewhat the molding operation and other related aspects.

Similarly, where vapor transmission characteristics become significant, as, for example, when a vacuum thermal regulation mode is utilized, the material used for the container should possess adequate characteristics so that the desired vacuum will be retained in service. Engineering plastics having such characteristics are known and may be used.

While perhaps more desirable from the standpoint of simplicity, connecting the battery of the present invention to the cooling/heating system of the vehicle is just one alternative. It is, of course, also suitable to position in the vehicle a separate source for whatever fluid is desired, as may be appreciated.

Figure 10:
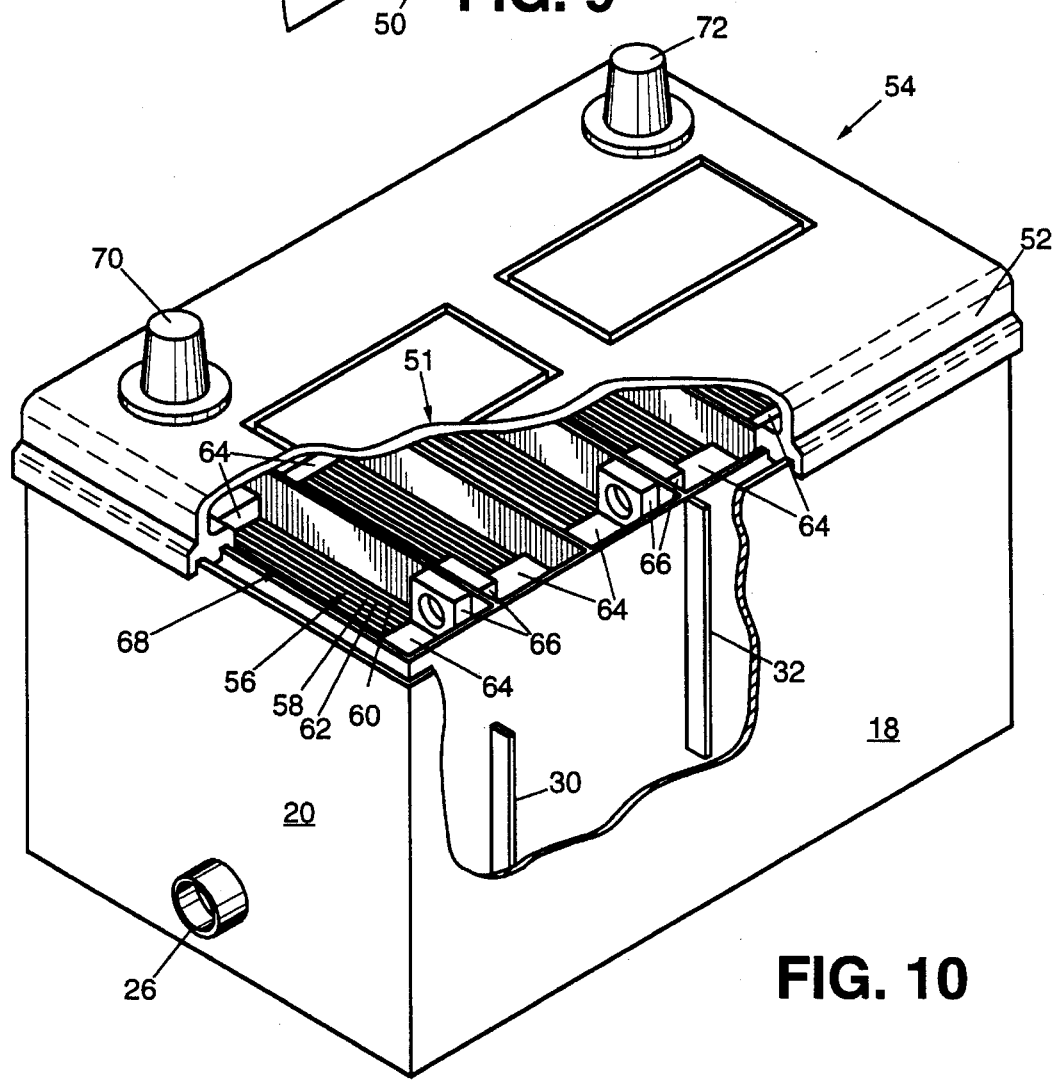
FIG. 10 is a perspective view of one embodiment of a battery in accordance with the present invention, with the cover being partially cutaway to show the cell elements and electrical connections of the battery.

FIG. 10 shows a battery in accordance with the present invention. As can be seen, in the portion of the cover 51 cut away of battery 54, a cell element shown generally at 56 is positioned in each cell. As is conventional, each cell element 56 comprises a series of alternating positive plates 58 and negative plates 60 separated by separators 62. Electrical connections are made through straps 64 and through intercell connectors shown generally at 66. In the end cell shown generally at 68, top terminal 70 is electrically connected to cell element 56. The other terminal 72 is similarly electrically connected in the other end cell.

Any conventional means may be utilized to make the appropriate cell elements and the necessary electrical connections. Indeed, one of the aspects of the present invention resides in the fact that the battery container which is utilized is amenable to assembly and production techniques already being employed in the commercial production of SLI lead-acid batteries.

Substantial versatility is provided by the present invention. If desired, the outside container can be dimensioned to fit into Conventional BCI SLI group sizes or may be oversized in those applications where conventionally sized cell elements are desired. In either event, any modification required in the size of the cell element can be readily accomplished.

Further, the casting of the strap onto the cell elements, making the intercell connections and sealing the cover to the container may all be carried out as is conventionally practiced with little or no modification required. Of course, sealing of the cover to the container will involve sealing both the outer and inner container walls to the cover; but the conventional sealing process may be used by simply providing appropriate platens to accommodate heat sealing, in effect, two containers rather than one as conventionally required.

FIGS. 11–14 illustrate another embodiment of a container which can be used in the battery of the present invention. The battery container 74 is identical to battery container 10 of the initial embodiment with one exception. More specifically, the principal difference between the two embodiments is that the downwardly depending fluid baffles used in the embodiment of FIGS. 11–14 are separately manufactured and inserted after the container itself is molded, rather than being formed in the molding process as in the container 10.

Figure 11:
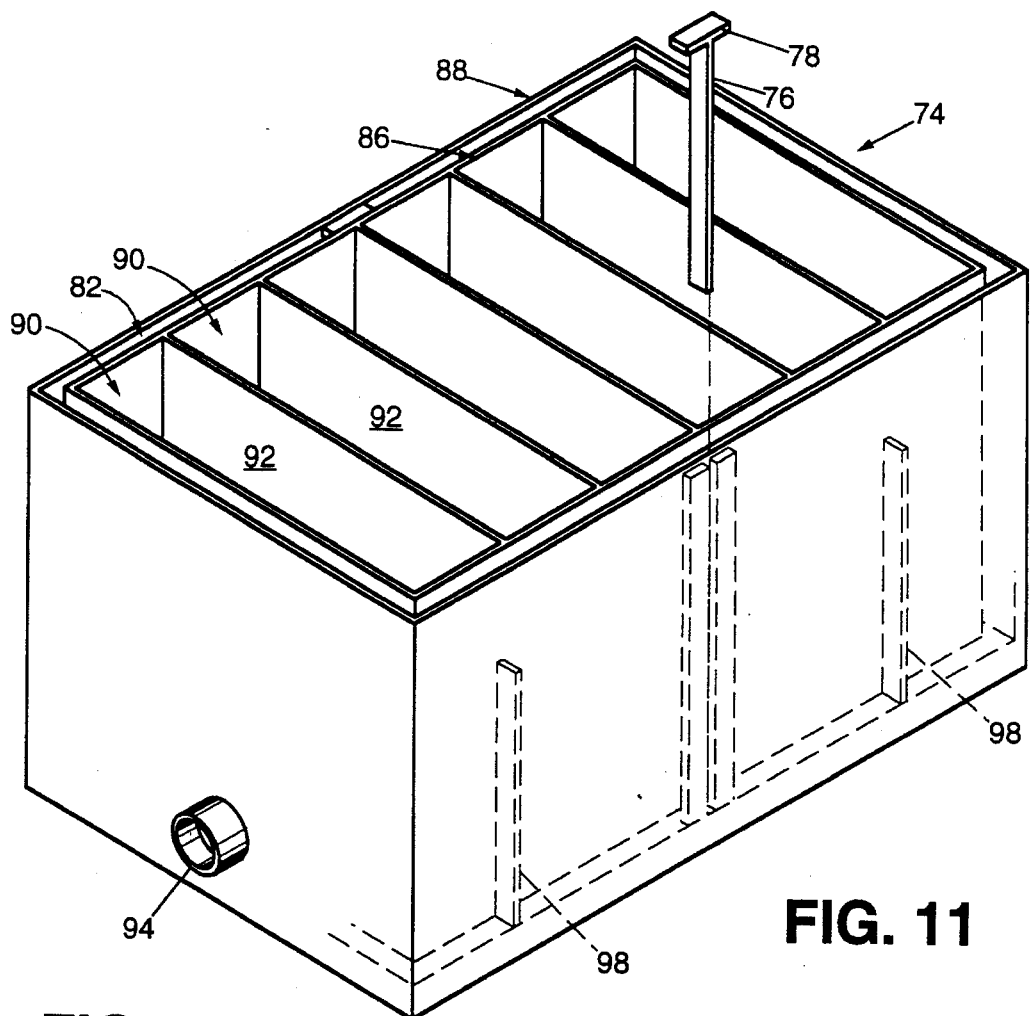
FIG. 11 is a perspective view of a further embodiment of a container that may be used in a battery of the present invention and illustrating an insertable fluid baffle prior to positioning in the container.
Figure 12:
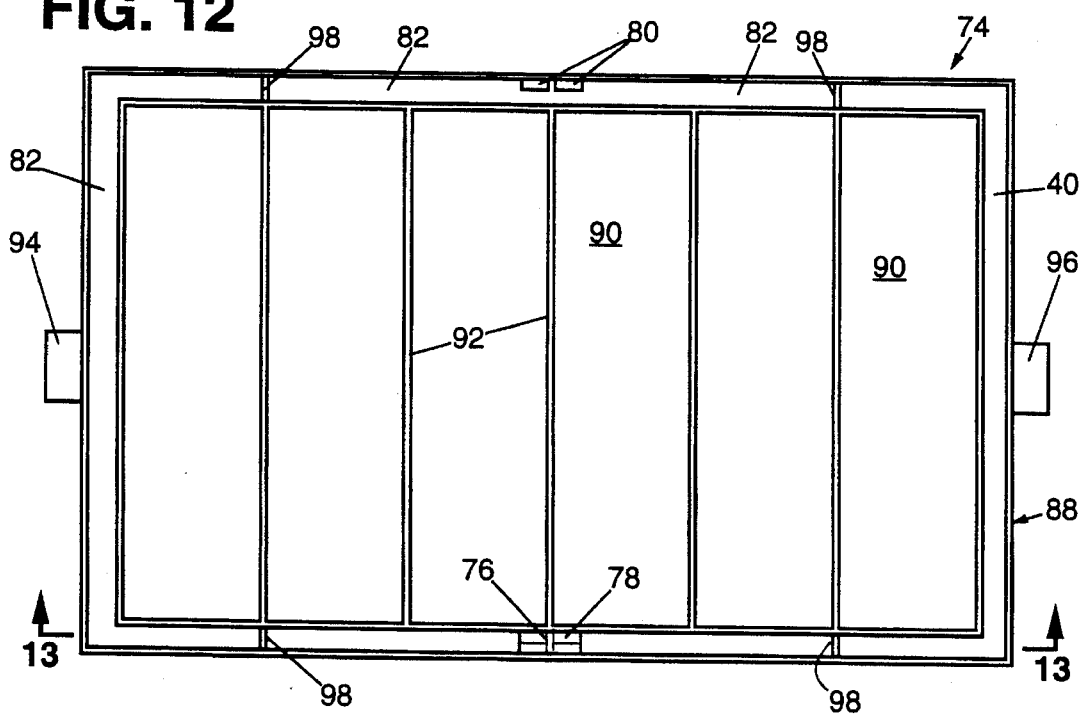
FIG. 12 is a top elevation view of the container embodiment shown in FIG. 11.
Figure 13:
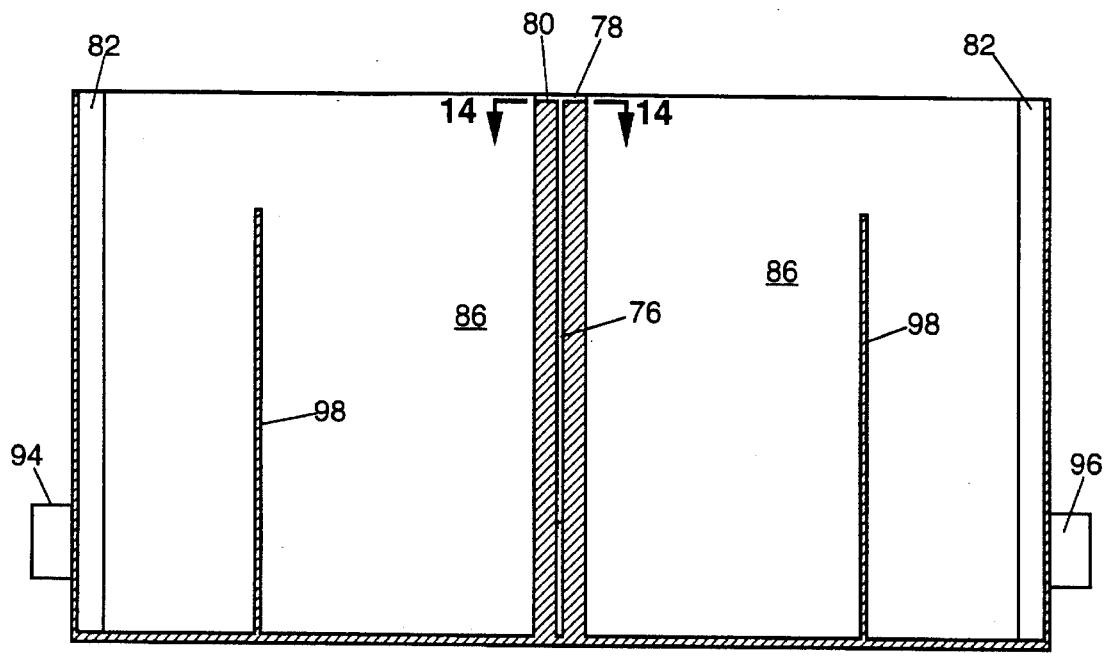
FIG. 13 is a cross-sectional view taken generally along line 13—13 of FIG. 12 and showing the insertable fluid baffle in position in the fluid compartment and guides assisting in the positioning of the fluid baffles.

Thus, as best seen in FIG. 11, one downwardly extending fluid baffle 76 is shown in position for insertion into container 74. Baffle 76 includes a head 78 that may desirably rest into recess 80 formed in fluid compartment 82 and configured to accept head 78. After assembly, head 78 may be tacked in place by conventional heat sealing, as is known.

Figure 14:
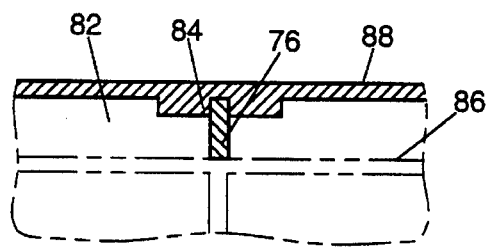
FIG. 14 is a cross-sectional view taken generally along line 14—14 of FIG. 13 and illustrating guides for the fluid baffle.

To facilitate assembly and to assist in maintaining fluid baffles 76 in the desired position, guide means can be utilized if desired. This may be accomplished, as best seen in FIG. 14, by ribs 84 formed into the container and suitably spaced to allow baffle 76 to be forced-fit therebetween.

One result of using this alternative embodiment is that the fluid compartment 82 is free of the apertures 50 (FIG. 5) that result in the other illustrative embodiment. In all other respects, the two illustrative embodiments are identical. Thus, as in the initially described embodiment, the battery container 74 as shown in the embodiment of FIGS. 11–14 includes an inner container 86, an outer container 88, cells 90 formed in inner container 86 by cell partitions 92, a fluid inlet 94 and, if desired, a fluid outlet 96, and upwardly extending fluid baffles 98.

The two illustrative embodiments discussed herein utilize double-walled containers. However, as may be appreciated, the present invention similarly contemplates utilizing a multi-wall container in which two adjacent fluid compartments are used. Indeed, while considered unnecessary and unduly complicated, multi-walled containers having more than two fluid compartments could be used.

It is contemplated that the use of a multi-walled container providing two adjacent fluid compartments might well achieve a degree, and control, of thermal regulation that would be useful for applications that present particularly hostile thermal environments for the battery. One suitable embodiment of a multi-wall container is shown in FIGS. 15–17.

Figure 15:
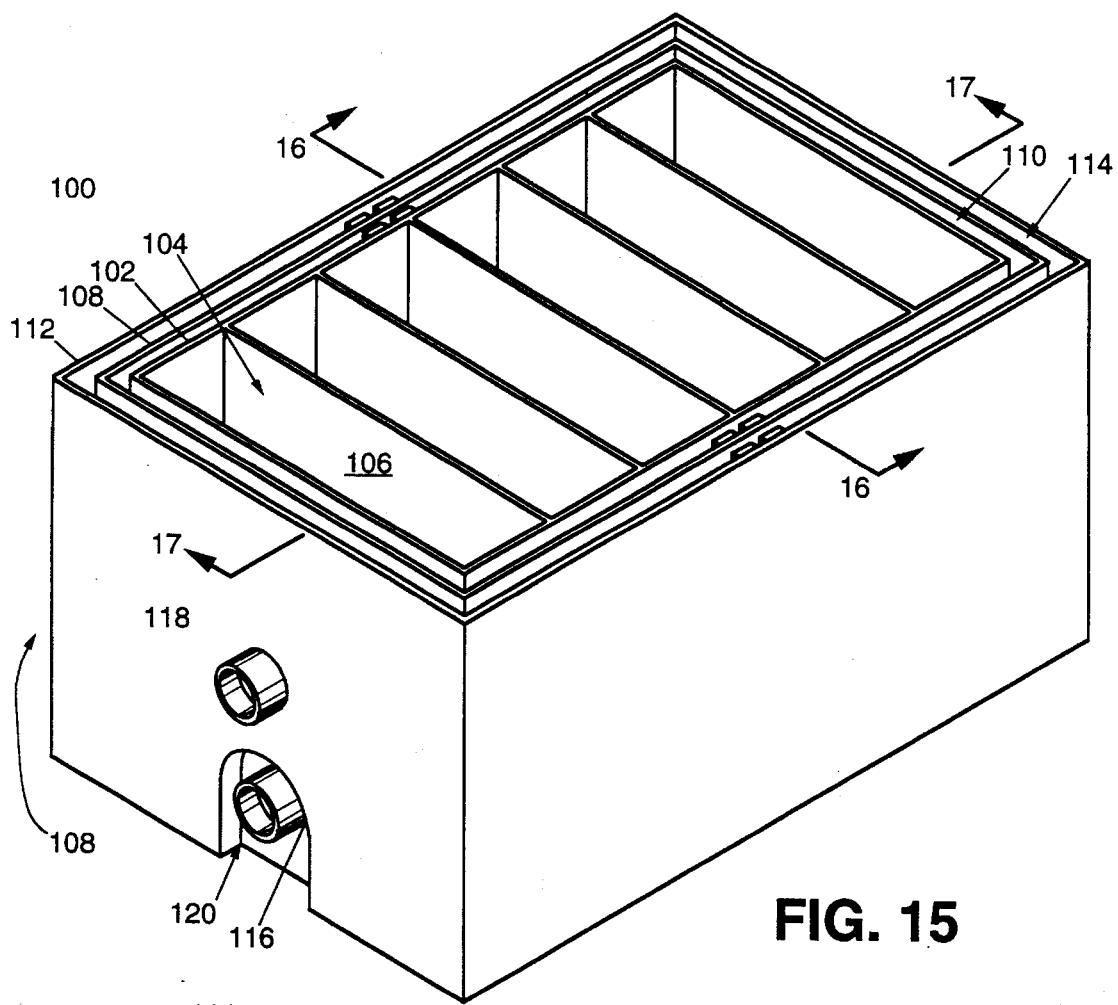
FIG. 15 is a perspective view of a still further embodiment of a container that may be used in a battery of the present invention and showing the two fluid compartments utilized in this container embodiment.
Figure 16:
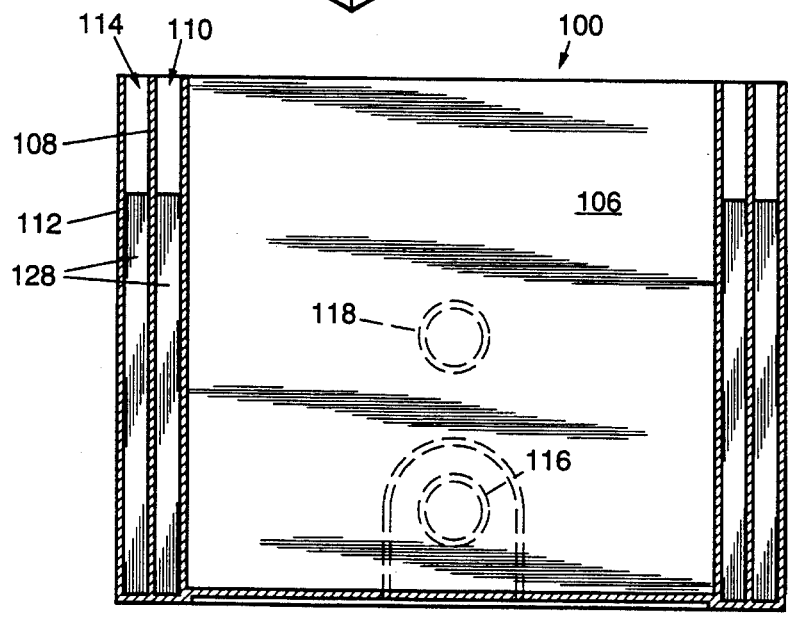
FIG. 16 is a cross-sectional view taken generally along line 16—16 of FIG. 15 and illustrating the relative positioning of the fluid inlets for the two fluid compartments.
Figure 17:
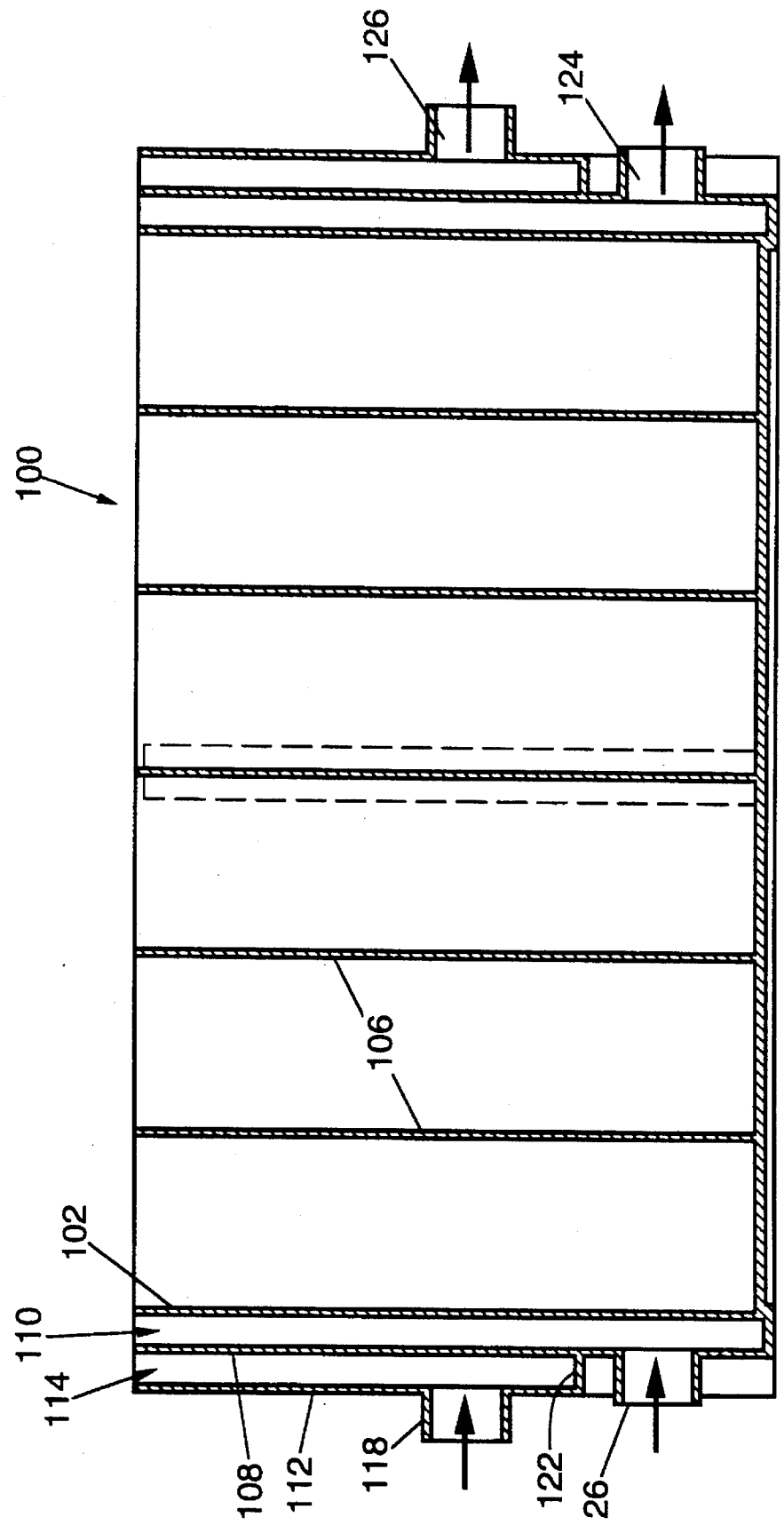
FIG. 17 is a cross-sectional view taken generally along line 17—17 of FIG. 15 and further showing the relative positioning of the two fluid inlets.

As seen in FIGS. 15–17, the multi-wall container 100 includes an inner container 102 divided into cells 104 by cell partitions 106, a first outer container 108 providing a first fluid compartment 110 and a second outer container 112 providing a second fluid compartment 114. First fluid inlet 116 provides ingress into first fluid compartment 110 while second fluid inlet 118 provides ingress into second fluid compartment 114. As best seen in FIGS. 15 and 17, first fluid inlet 116 is inset at 120 (FIG. 15) and the second fluid compartment 114 is separated from the first fluid inlet by partition 122 (FIG. 17). The structure for the two fluid inlets can be molded, as may be appreciated, while providing satisfactorily fluid-tight fluid compartments. Where used, optional first fluid outlet 124 and second outlet 126 (FIG. 17) may be configured and molded in similar fashion to the fluid inlets. Other configurations may be used as desired for the respective fluid inlets and outlets.

In all other respects, multi-walled container 100 may be molded and configured as discussed in relation to the first two embodiments. Thus, any configuration of fluid baffles may be used that will satisfy the criteria for the particular application. As seen in FIG. 16, fluid baffles 128 are shown.

Further, the considerations discussed regarding the materials used and the thermal regulation modes for the first two embodiments are applicable to the container embodiment shown in FIGS. 15–17.

One particularly desirable thermal regulation mode for a battery of the present invention utilizing a multi-walled container consists of a dual mode in which a vacuum is maintained in first fluid compartment 110 and air from the heating/cooling system of the vehicle is circulated through second fluid compartment 114. Particularly desirable would be the use of the vacuum pump in the vehicle, supplemented by, if needed, an accumulator so that a vacuum is maintained in first fluid compartment 110 even when the vehicle is not in use. In this fashion, even when not in use, the battery is protected from the surrounding hostile environment. Of course, if desired, vacuum or fluid could be used in the first and second fluid compartments in any combination.

In the embodiments previously illustrated, an injection molded integral plastic container was utilized to provide the inner and outer containers. While advantageous for many applications, other embodiments according to this invention utilize separately molded inside and outside containers that are configured to provide an assembly which achieves the external passive or active thermal heating or cooling resulting from the use of an integrally formed multi-wall container. Indeed, other than being separately molded, the resulting assembly can be configured to be the same, or essentially the same, as the integrally molded container embodiments. However, if desired, utilizing separately molded containers can allow even greater versatility, such as, for example, providing improved thermal regulation as will hereinafter be described.

Figure 18:
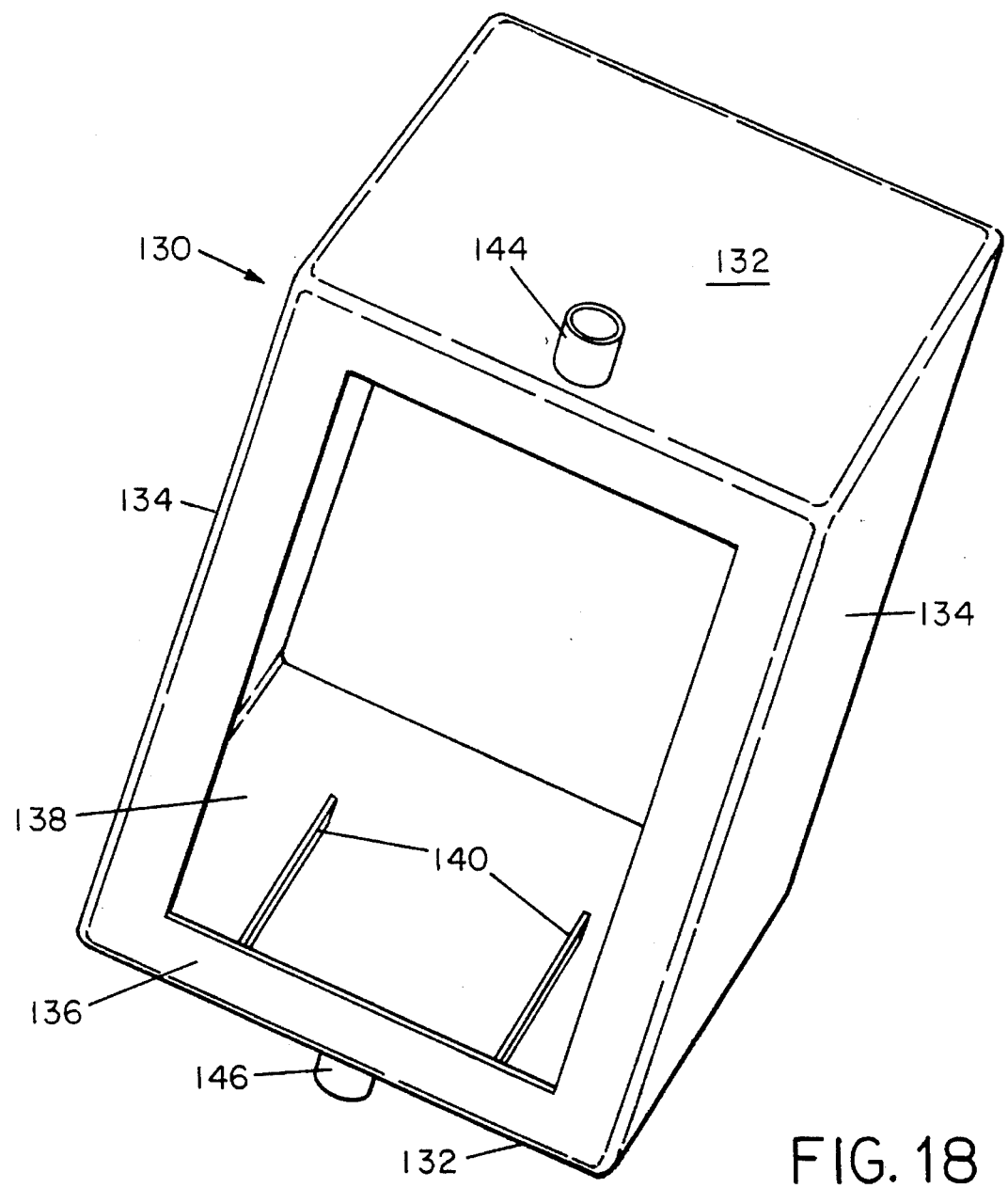
FIG. 18 is a bottom perspective view of one embodiment of an outside container that may be employed to provide a two-piece dual wall container in accordance with this invention, and showing an open bottom.

FIGS. 18–22 illustrate one embodiment employing separately molded containers to provide a two-piece dual wall container pursuant to the present invention. As shown in FIG. 18, an outside container 130 comprises end walls 132, side walls 134 and a lip 136 extending about the periphery of the bottom that is otherwise open as indicated at 138. Baffles 140 are formed on end walls 132, extending upwardly from the container bottom. Each of the baffles is less than the height of the container, as are baffles 142 which extend upwardly along part of side walls 134. Fluid inlet 144 and optional fluid outlet 146 allow fluid ingress and egress.

In this, and, indeed, in all of the embodiments of the instant invention the fluid inlet and outlet may be molded with a plug that can later be removed to open the fluid flow path. In this fashion, inventory can be simplified to provide coverage for applications regardless of whether thermal regulation is currently desired.

Figure 19:
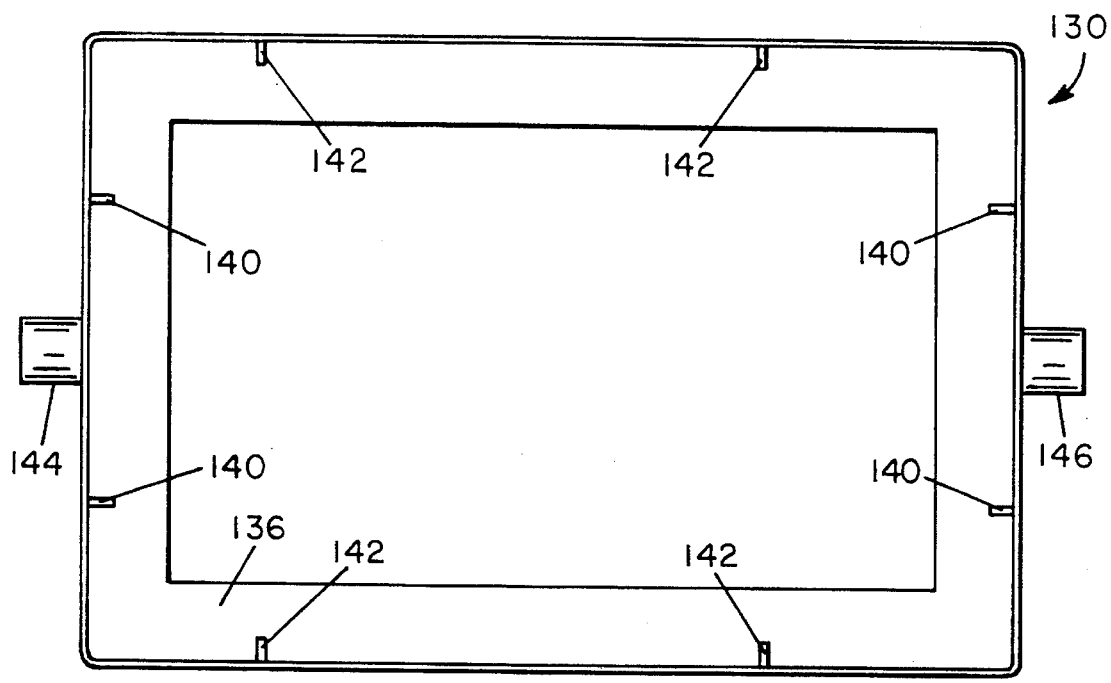
FIG. 19 is a cross-sectional view of the outside container shown in FIG. 18 and illustrating the positioning of the baffles relative to the lip around the periphery of the open bottom.
Figure 20:
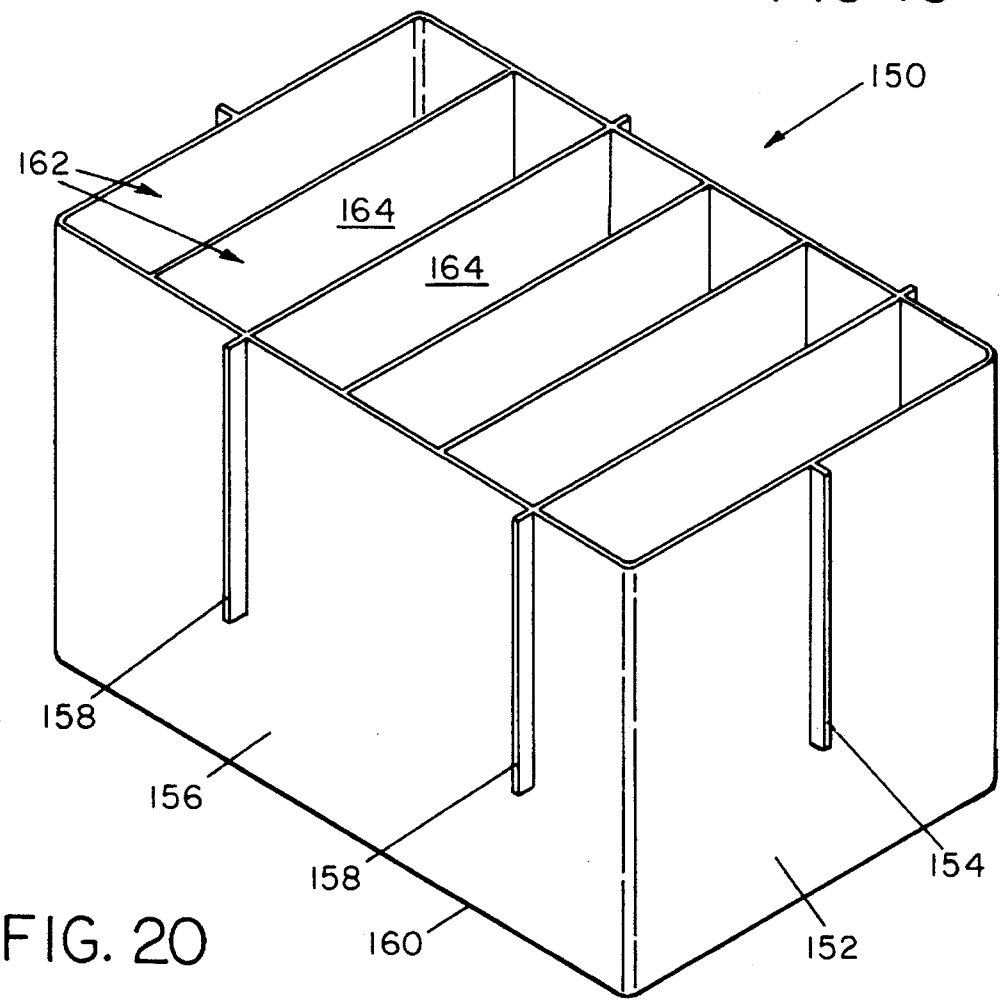
FIG. 20 is a perspective view of an inside container which may be used with an outer container, such as, for example, the outside container of FIGS. 18–19 to provide a two-piece dual wall container according to the present invention.

FIG. 20 illustrates one embodiment of an inside container 150 that may be used with an outside container, such as, for example, that shown in FIGS. 18–19 to form a dual wall container. The inside container 150 comprises end walls 152 each having a downwardly extending baffle 154, side walls 156 having downwardly extending baffles 158 and a bottom 160. Container 150 is divided into cells 162 by partitions 164.

Figure 21:
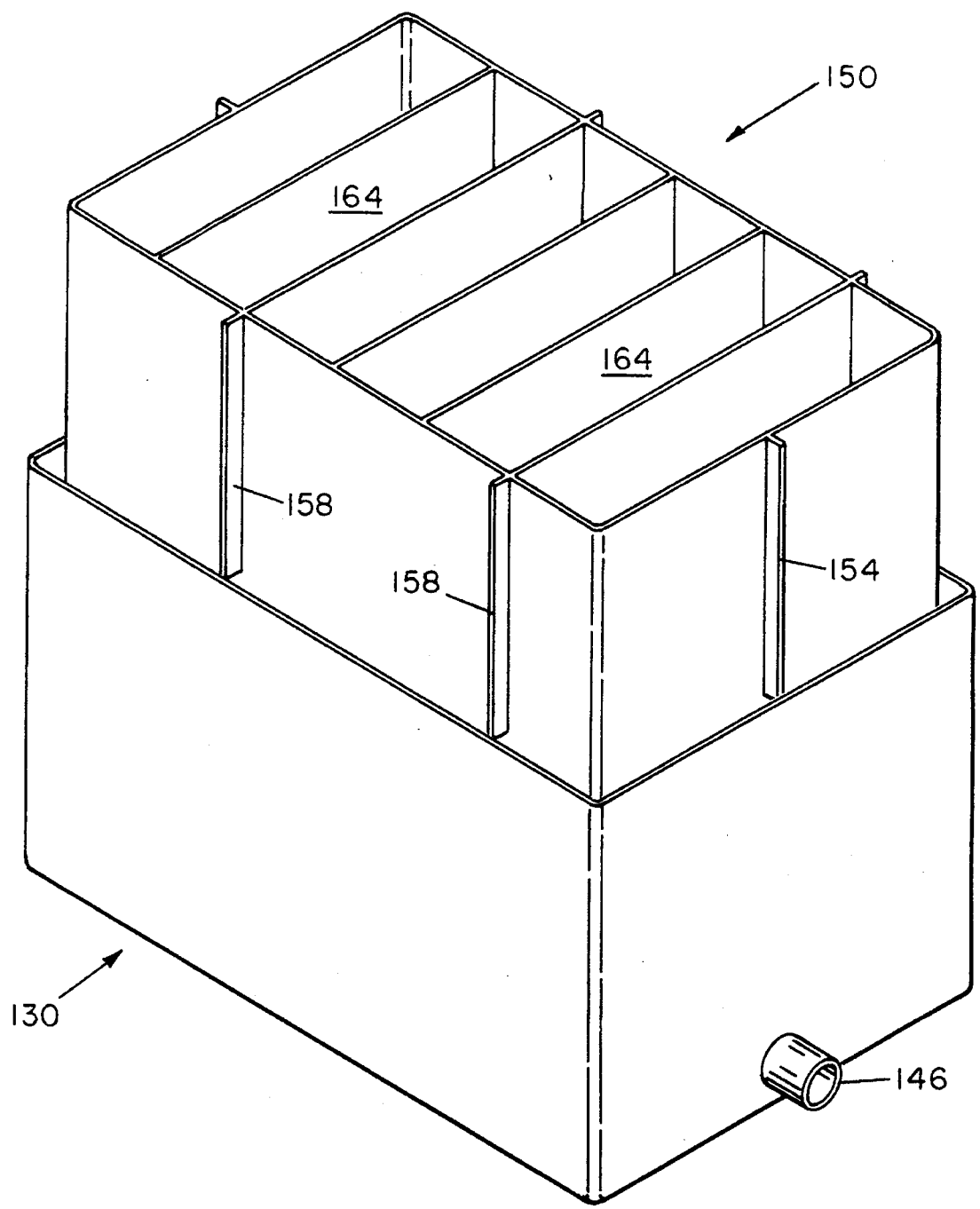
FIG. 21 is an exploded perspective view of the inside container of FIG. 20 being inserted into the outside container of FIGS. 18–19.
Figure 22:
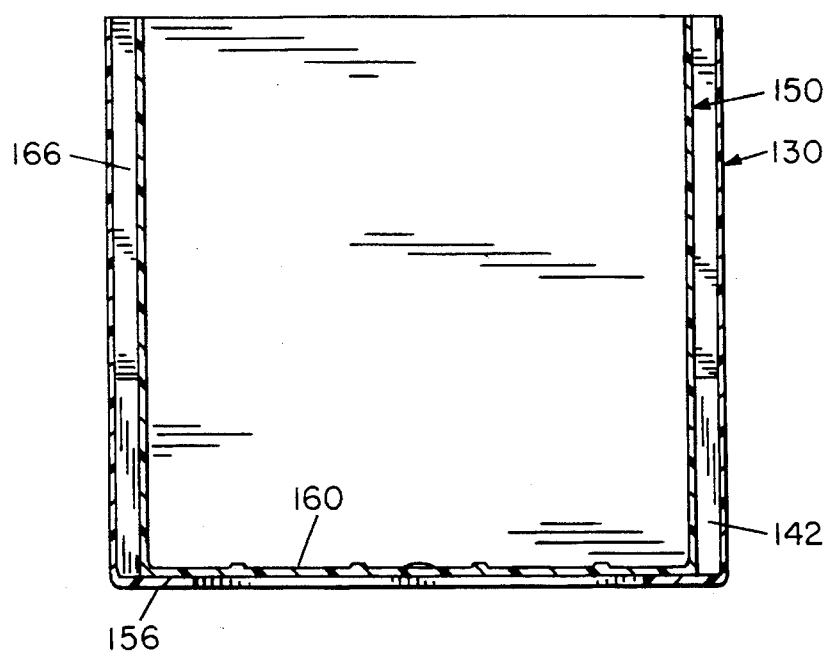
FIG. 22 is a cross-sectional view of the two-piece dual wall container shown in FIG. 21 with the inside container sealed to the lip on the bottom of the outside container.

As can be seen from FIG. 21, when the inside container of FIG. 20 is assembled with an outside container, the end and sidewall baffles of each container are positioned to provide a fluid flow path about the periphery of the inside container in the fluid compartment 166 formed between outside container 130 and inside container 150. Assembly of the two containers also includes heat sealing or otherwise attaching the two containers together so the resulting assembled dual wall battery can be handled as a unit and not be detachable from one another. A variety of techniques are known and may be used. As seen in FIG. 22, the dual wall container shown has bottom 160 of inside container 150 heat sealed to lip 156 which extends about the periphery of the open bottom 138 outside container 130. The size of lip 156 should thus be satisfactory to support inside container 150, and, when desired, to also provide an adequate fusion surface for heat sealing the two containers together.

One benefit of separately molding the two containers is that, from the perspective of injection molding, the molding operation may be simplified as compared to that used for an integrally molded container when core locks or the like are employed as in FIGS. 6–9. Thus, molds can be used which allow the molded part to be formed and then extracted from the mold in a straightforward fashion as is known.

Figure 23:
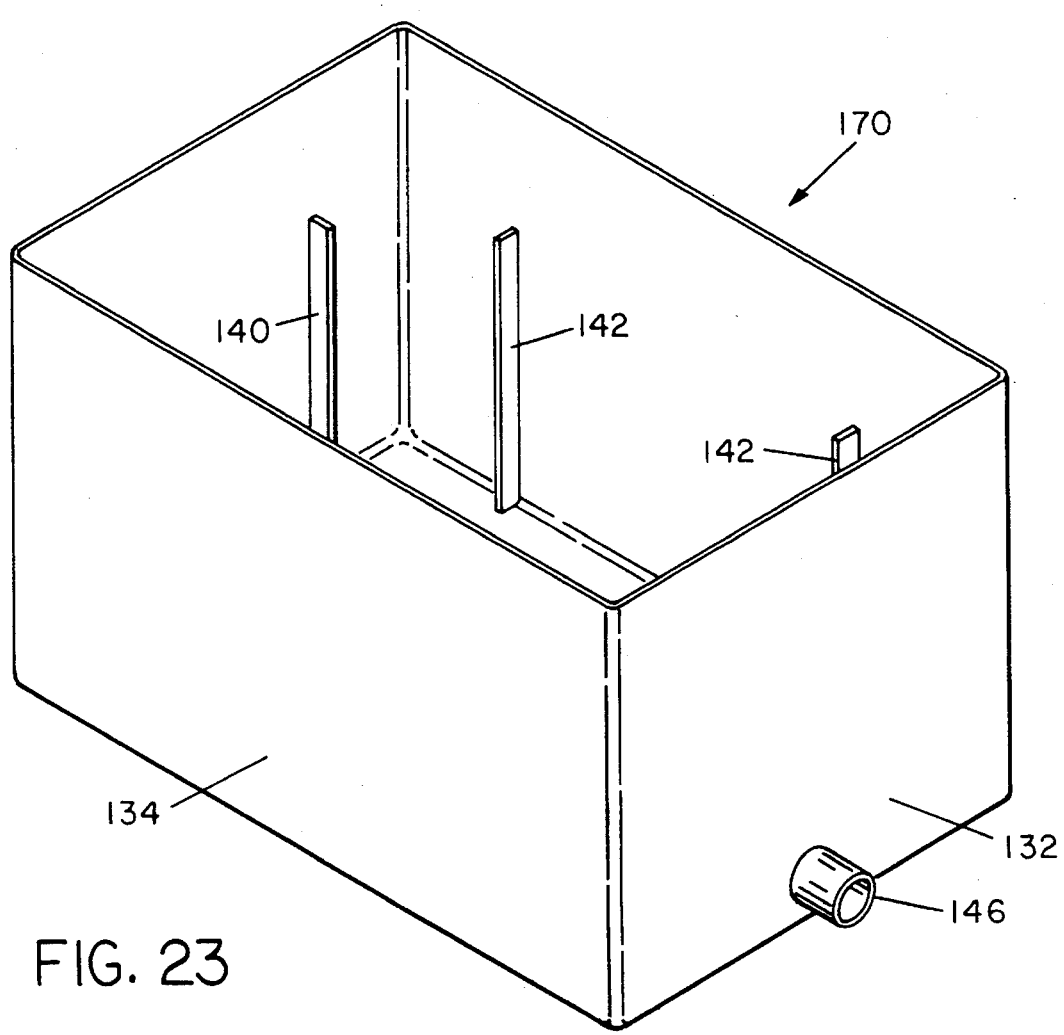
FIG. 23 is a perspective view of another embodiment of an outside container that may be utilized with the inside container of FIG. 20 to provide another embodiment of a two-piece dual wall container according to the present invention.
Figure 24:
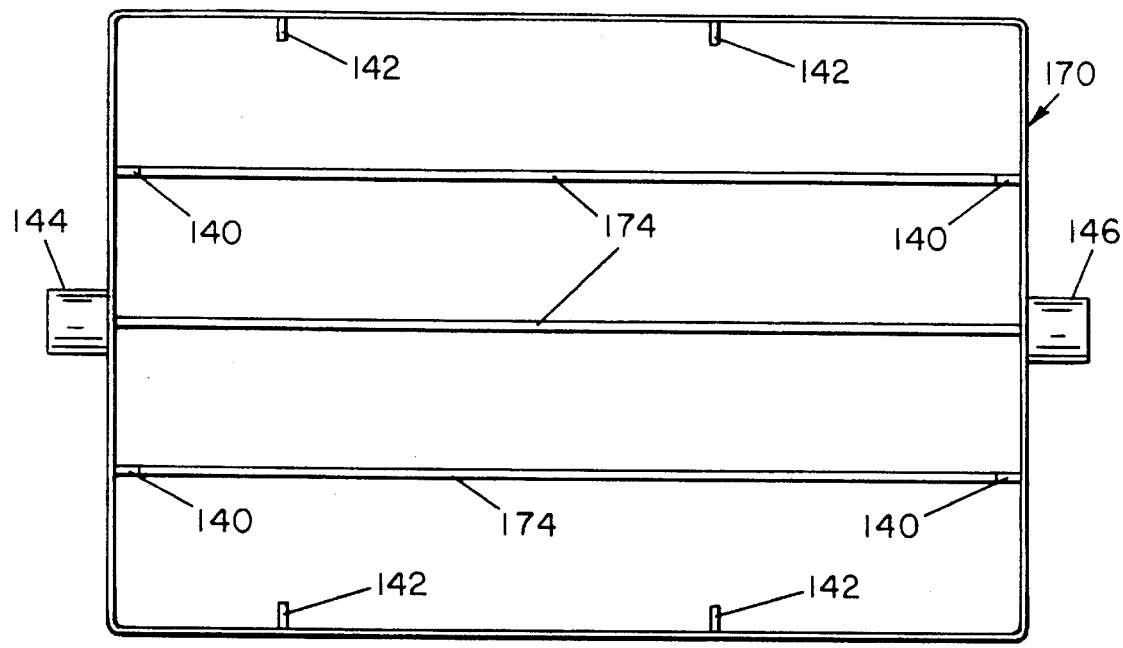
FIG. 24 is a cross-sectional view of the outside container of FIG. 23 and illustrating the ribs on the bottom of the container.
Figure 25:
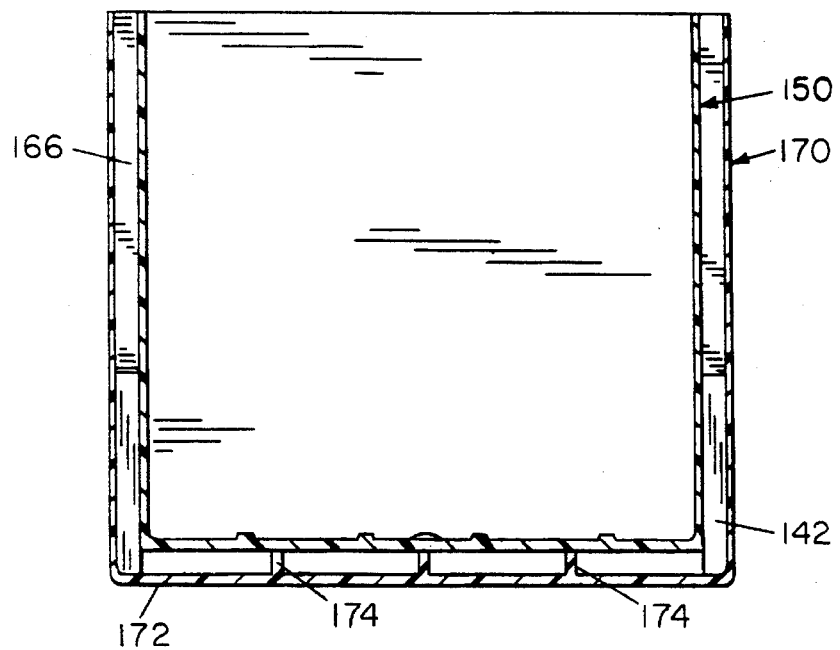
FIG. 25 is a cross-sectional view of the assembly of the inside container of FIG. 20 resting on the bottom ribs of the outside container of FIGS. 23–24.

FIGS. 23–25 show a further embodiment of an outside container 170 configured essentially the same as the outside container of FIGS. 18–19. For simplicity, the common elements are identified with the same numerals. The one exception is that outside container 170 has a closed bottom 172 (as best seen in FIGS. 24 and 25). If desired, inside container 130 may be supported on ribs 174.

Figure 26:
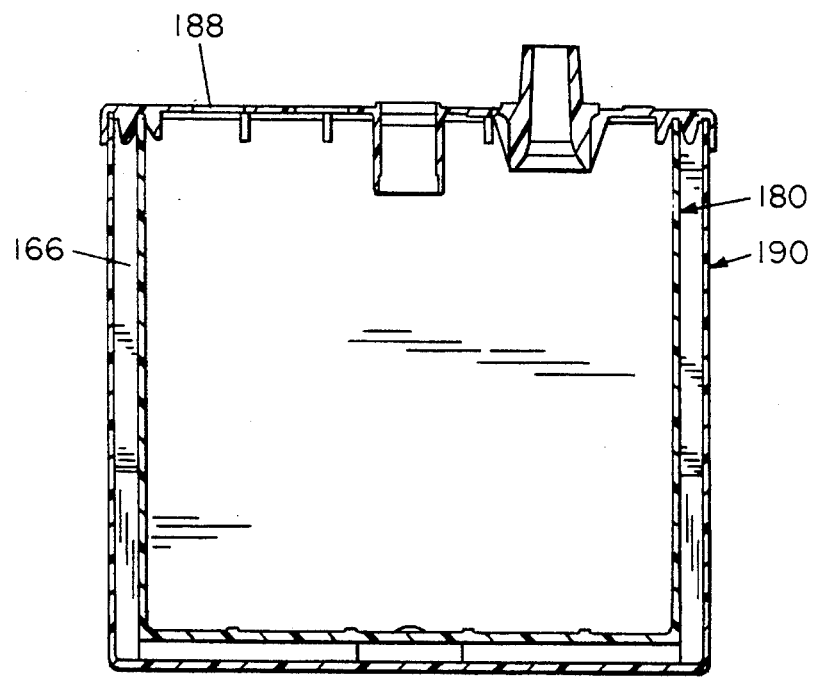
FIG. 26 is a cross-sectional view of yet another embodiment of the two-piece dual wall container of the present invention, utilizing an outside container configured to provide fluid flow about the bottom of the inside container, as well as along the sidewalls of the inside container.
Figure 27:
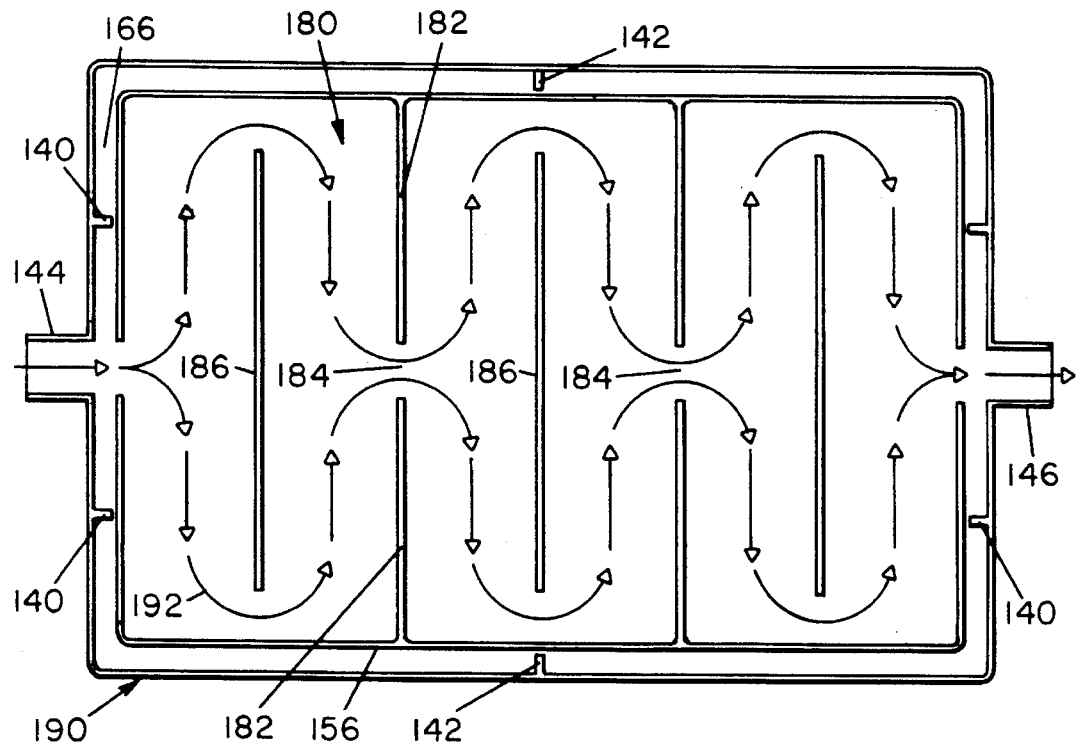
FIG. 27 is a cross-sectional view of the two-piece dual wall container embodiment shown in FIG. 26, illustrating the fluid flow path about the bottom of the inside container.

Yet another embodiment of the outside and inside containers that may desirably be used in accordance with this invention is shown in the dual wall container assembly illustrated in FIGS. 26–27. In this embodiment, improved thermal regulation is achieved since the configuration provides a fluid flow path about the bottom of the inside container as well as about the side and end walls as in prior embodiments. Again, the common elements use the same numerals described in the prior embodiments.

To provide the fluid flow path about the bottom of the inside container, inside container 180 is provided with downwardly extending baffles 182 that extend inwardly from the side walls 156, interrupted by fluid flow opening 184. Upwardly extending baffles 186 on outside container 190 extend from the bottom of the outside container 190 and extend across the width, terminating short of the side walls of the inside container 180 so as to provide a fluid flow path as shown at 192.

As may be appreciated, a variety of baffle designs may be utilized. What is considered important is that the baffles on the inside and/or outside containers provide a sufficiently tortuous or serpentine path as fluid flows from the inlet under and about the bottom of the inside container to achieve the desired thermal regulation. It should also be appreciated that the location of the respective baffles on the inside and/or outside containers can be varied as desired, consistent with desired molding or other considerations. More particularly, the two embodiments in FIGS. 18–25 represent preferred embodiments. However, if desired, and as one example of another configuration, all of the baffles could be molded integral with the inside container. In addition to simplifying the molding of the outside container, this configuration would allow positioning the baffles as, in effect, extensions of the cell partitions so as to minimize the effects of warpage. Thus, in this configuration, any warpage of the molded containers would be more uniform. However, in contrast to the illustrative embodiments in which the upstanding baffles are integrally formed with the outside container, thereby eliminating any fluid flow between the bottom of such baffles and the container bottom, the proposed alternative configuration will require care to eliminate, or at least essentially eliminate, fluid flow which bypasses the desired path.

Likewise, in the embodiment shown in FIGS. 26–27, other baffle arrangements could be used; and, also, the baffles employed could all be formed on either the inside or outside containers, if desired. Indeed, for some applications, it may be preferred to have the bottom baffles all formed integral with the outside container.

One method of sealing the two containers shown in FIGS. 26–27 together is by heat sealing a cover 188 onto both the inside container 180 and the outside container 190 as shown in FIG. 26. This approach, as may be appreciated, also can be used to secure together the container in other embodiments. What is important is that the two containers are adequately secured so that detachment, one from the other, is effectively prevented. Further, it is preferred to seal the container bottoms together. It is thus believed that this method of attachment will be less susceptible to dislodging the containers, one from another, in actual use under severe vibration or other unduly rough handling.

Whether an integrally formed molded container is used or a two-piece dual container is employed, the resulting assembled battery will have the configuration shown in FIG. 10. The particular embodiment selected will depend upon the criteria deemed desirable for a particular application.

While the embodiments shown in FIGS. 18–27 utilize two containers, it should be appreciated that this approach is fully applicable to applications requiring three, or even more, containers. As one example, three separate containers could be employed to provide a battery where two fluid compartments are considered appropriate, as is shown in the integrally formed container shown in FIGS. 15–17.

Thus, as has been seen, the present invention provides a highly versatile solution to the seemingly ever-increasing, more hostile environments in which SLI automotive batteries must reliably perform over the longer service life being demanded by vehicle manufacturers. Yet, the solution achieved is obtained without unduly complicating conventionally used SLI lead-acid battery assembly and manufacturing processes.

While this invention has been disclosed primarily in terms of the specific embodiments thereof, it is not intended to be limited thereto. For example, while described in conjunction with SLI lead-acid batteries, the present invention can be used for other types of batteries used in environments wherein it is desired to reduce the thermal effects by preventing convection-induced, heat transfer from the ambient environment to the battery itself. One example would be lead-acid batteries used for electric vehicle applications. Also, while principally described in connection with alleviating the high underhood temperatures that have proved so significant due to premature failure in service, the present invention is likewise well suited for dealing with cold environments where heating is needed to enhance battery performance. Additionally, while the illustrated embodiments show a top terminal configuration, the present invention may be used with dual terminal configurations as shown, for example, in U.S. Pat. Nos. 4,645,725 and 4,701,386. Likewise, with suitable modification of the fluid compartment, side terminal configuration could also be accommodated. Still further, while injection molding has been discussed herein and is commonly used to make containers for SLI lead-acid batteries, it should be appreciated that any other type of molding could be employed, if desired. Other modifications and embodiments will be apparent to the worker in the art.

What is claimed:

1. A lead-acid storage battery comprising at least one inside plastic container having a bottom and top, partitions dividing said inside container into cells, an outside container spaced from said inner container to provide a fluid compartment annular space around the periphery of the battery defined by height and width and having end and side portions, at least one of said inside and outside containers having a series of fluid baffles spanning the width of said fluid compartment, each of said fluid baffles being less than the height of the fluid compartment and providing a fluid flow path through the fluid flow compartment and about the inside container, a fluid inlet formed in said outside container and allowing ingress into said fluid compartment, said inside and outside containers being attached to each other, a cell element comprising positive and negative plates and separators positioned in said cells, said cells being electrically connected together, a cover sealed to at least said inside battery container, and terminals electrically connected to said cell elements.

2. The battery of claim 1, wherein said container is a thermoplastic material.

3. The battery of claim 1, wherein there are at least three fluid baffles located in each side portion of said fluid compartment.

4. The battery of claim 3, wherein said fluid baffles are aligned with the cell partitions.

5. The battery of claim 1, which includes a fluid outlet in communication with said fluid compartment.

6. The battery of claim 1, which includes fluid baffles downwardly extending from the top of the inside container and fluid baffles upwardly extending from the bottom of the outside container.

7. The battery of claim 6, wherein the upwardly and downwardly fluid baffles are alternately positioned.

8. The battery of claim 1, wherein said outside container includes a lip about the periphery of the bottom and has an otherwise open bottom, the inside container rests on said lip, and said inside and outside containers are secured to one another about at least a part of the lip.

9. The battery of claim 8, wherein the outside and inside containers are heat sealed together.

10. The battery of claim 1, wherein said outside container includes a bottom having upstanding ribs and said inside container rests upon said ribs.

11. The battery of claim 1, wherein said outside container has a closed bottom and the bottom of at least one of said inside and outside containers includes baffles to provide a path for fluid flow about the bottom of the inside container.

12. The battery of claim 11, wherein the fluid baffles extend upwardly from the bottom of said outside container and extend downwardly from the bottom of said inside container and are alternately positioned.

13. The battery of claim 12, wherein the upwardly extending fluid baffles from the bottom of the inside container terminate short of the side portions of the inside container and the fluid baffles depending downwardly from the inside container are interrupted at a position adjacent the center of the bottom of the inside container.

14. A lead-acid storage battery comprising at least one inside plastic container having a bottom and top, partitions dividing said inside container into cells, an outside container spaced from said inner container to provide a fluid compartment annular space around the periphery of the battery defined by height and width and having end and side portions, at least one of said inside and outside containers having a series of fluid baffles spanning the width of said fluid compartment, each of said fluid baffles being less than the height of the fluid compartment and providing a fluid flow path through the fluid flow compartment and about the inside container, a fluid inlet formed in said outside container having a plug which may be removed to allow ingress into said fluid compartment, said inside and outside containers being attached to each other, a cell element comprising positive and negative plates and separators positioned in said cells, said cells being electrically connected together, a cover sealed to at least said inside battery container, and terminals electrically connected to said cell elements.

* * * * *